United States Patent
Furuse et al.

(10) Patent No.: US 11,072,720 B2
(45) Date of Patent: Jul. 27, 2021

(54) AQUEOUS INK, INK CARTRIDGE AND INK JET RECORDING METHOD

(71) Applicant: CANON KABUSHIKI KAISHA, Tokyo (JP)

(72) Inventors: Tsuyoshi Furuse, Isehara (JP); Naofumi Shimomura, Kawasaki (JP); Takayuki Horiuchi, Kawasaki (JP); Akemi Watanabe, Hiratsuka (JP); Yoko Uetake, Yokohama (JP); Shoji Shiba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 16/542,543

(22) Filed: Aug. 16, 2019

(65) Prior Publication Data

US 2020/0071554 A1   Mar. 5, 2020

(30) Foreign Application Priority Data

Aug. 30, 2018 (JP) .............................. JP2018-161653
Aug. 1, 2019 (JP) .............................. JP2019-142042

(51) Int. Cl.
| | | |
|---|---|---|
| C09D 11/38 | (2014.01) | |
| C09D 11/101 | (2014.01) | |
| C09D 11/102 | (2014.01) | |
| B41J 2/175 | (2006.01) | |
| B41J 11/00 | (2006.01) | |
| C09D 11/033 | (2014.01) | |
| B41M 5/00 | (2006.01) | |

(52) U.S. Cl.
CPC ........... *C09D 11/38* (2013.01); *B41J 2/17553* (2013.01); *B41J 11/002* (2013.01); *B41M 5/0023* (2013.01); *C09D 11/033* (2013.01); *C09D 11/101* (2013.01); *C09D 11/102* (2013.01)

(58) Field of Classification Search
CPC ..... C09D 11/38; C09D 11/101; C09D 11/102; C09D 11/033; B41J 11/002
USPC .................................................. 347/95, 100
See application file for complete search history.

(56) References Cited

U.S. PATENT DOCUMENTS

| | | |
|---|---|---|
| 5,593,757 A | 1/1997 | Kashiwazaki et al. |
| 8,124,791 B2 | 2/2012 | Shinjo et al. |
| 8,282,725 B2 | 10/2012 | Shimomura et al. |
| 8,807,699 B2 | 8/2014 | Ooishi et al. |
| 9,365,733 B2 | 6/2016 | Hayashi et al. |
| 9,738,803 B2 | 8/2017 | Horiuchi et al. |
| 9,868,298 B2 * | 1/2018 | Maeda .............. C09D 11/34 |
| 9,988,541 B2 | 6/2018 | Shimomura et al. |
| 10,131,806 B2 | 11/2018 | Hayashi et al. |

(Continued)

FOREIGN PATENT DOCUMENTS

| | | |
|---|---|---|
| JP | 2009-132812 A | 6/2009 |
| JP | 2011-201973 A | 10/2011 |

(Continued)

*Primary Examiner* — An H Do
(74) *Attorney, Agent, or Firm* — Venable LLP (57) ABSTRACT

The present invention provides an aqueous ink of active energy ray curable type for ink jet. The aqueous ink contains resin particles and a photo acid generator. The resin particles include a reactive group-containing resin having at least one reactive group selected from the group consisting of an epoxy group, an oxetanyl group and a vinyl ether group. Further provided are an ink cartridge and an ink jet recording method in which the aqueous ink is used.

9 Claims, 2 Drawing Sheets

(56) References Cited

U.S. PATENT DOCUMENTS

| | | |
|---|---|---|
| 2011/0237700 A1 | 9/2011 | Miyabayashi |
| 2013/0016156 A1 | 1/2013 | Ooishi et al. |
| 2013/0209695 A1 | 8/2013 | Fukagawa |
| 2017/0240754 A1* | 8/2017 | Tsuchiya .............. C09D 11/102 |
| 2018/0111388 A1* | 4/2018 | Fujita .................. C09D 11/033 |
| 2018/0320072 A1* | 11/2018 | Ridaoui ............... C09K 19/408 |

FOREIGN PATENT DOCUMENTS

| | | |
|---|---|---|
| JP | 2011-208093 A | 10/2011 |
| JP | 2013-163794 A | 8/2013 |

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

It is growingly demanded in recent years to be able to record an image on a recording medium having poor ink absorbability, as well as ink-absorbable recording mediums, using an aqueous ink and an ink jet recording method. In order to respond to increasingly higher speed of image recording, it is also demanded to allow ink components, such as coloring material and resin, to be more promptly fixed on a recording medium. Images exhibited outdoors, including posters, panels, sign boards and POP advertisements, should necessarily excel in abrasion resistance and water resistance, as compared with typical printed matters conventionally produced.

To enable high-speed recording of an image having excellent fixability, for example, an aqueous ink which contains a compound that causes a reacted in response to irradiation of an active energy ray (polymerizable compound) is currently discussed. An example of such an ink disclosed so far is a photo-curable ink containing, as a polymerizable compound, a reaction product of maleimide carboxylic acid and aromatic diamine having an acid group (Japanese Patent Application Laid-Open No. 2009-132812). A photo-curable recording liquid has also been disclosed that contains a hydrophobic photo-polymerization initiator and a block polymer including a hydrophilic block and a hydrophobic block having a radically polymerizable group (Japanese Patent Application Laid-Open No. 2011-201973).

SUMMARY OF THE INVENTION

However, the inks described in Japanese Patent Application Laid-Open Nos. 2009-132812 and 2011-201973 have difficulty in recording an abrasion-resistant image durable against outdoor environment, because oxygen present in the atmosphere may often inhibit the radical polymerizations. Another disadvantage with the inks described in Japanese Patent Application Laid-Open Nos. 2009-132812 and 2011-201973 is that the polymerizable compounds used in these inks are highly hydrophilic, which makes it difficult to record an image having desirable water resistance.

The present invention is directed to providing an aqueous ink that allows an image that excels in abrasion resistance and water resistance to be successfully recorded. The present invention is also directed to providing an ink cartridge and an ink jet recording method using the aqueous ink.

The technical aspects of the present invention can be achieved as described below. That is, according to the present invention, an aqueous ink of active energy ray curable type for ink jet is provided. The aqueous ink contains resin particles and a photo acid generator. The resin particles include a reactive group-containing resin having at least one reactive group selected from the group consisting of an epoxy group, an oxetanyl group and a vinyl ether group.

The present invention can provide the aqueous ink that may allow an image improved in abrasion resistance and water resistance to be successfully recorded. The present invention can further provide an ink cartridge and an ink jet recording method in which the aqueous ink is used.

Further features of the present invention will become apparent from the following description of exemplary embodiments with reference to the attached drawings.

BRIEF DESCRIPTION OF THE DRAWINGS

FIGS. 2A and 2B are schematic views of an ink jet recording apparatus used in an ink jet recording method according to the present invention.

DESCRIPTION OF THE EMBODIMENTS

The present invention is hereinafter described in further detail with preferred embodiments. When a compound used in the present invention is a salt, the salt is dissociated into ions and present in the ink, which is, however, phrased as "an ink containing a salt" for the sake of simplicity. The aqueous ink for ink jet may be simply referred to as "ink". As described herein, values of physical properties refer to values at normal temperature (25° C.) and at normal pressure (1 atm), unless otherwise specified. As described herein, "unit" of a resin means a repetitive unit derived from one monomer or one unit structure, unless otherwise specified. As described herein, "(meth)acrylic acid" and "(meth)acrylate" respectively indicate "acrylic acid and methacrylic acid" and "acrylate and methacrylate".

Recently, increasingly higher levels of abrasion resistance and water resistance than in the known art required of images to be recorded. The inventors of the present invention have discussed and studied an aqueous ink of an active energy ray curable type usable to record such images. Then, the inventors have found out that the polymerizable compounds conventionally used in the known inks have the following disadvantages; progresses of their polymerization reactions are often disturbed, and their high hydrophilic properties lead to poor abrasion resistance and water resistance of recorded images.

Based on these facts, the inventors have further discussed and studied these issues of the known inks, which has led them to the finding that images markedly improved in abrasion resistance and water resistance may be obtained with an aqueous ink containing a photo acid generator and resin particles including a reactive group-containing resin having a particular reactive group. The reactive group to be incorporated in the reactive group-containing resin constituting the resin particles is at least one selected from the group consisting of an epoxy group, an oxetanyl group and a vinyl ether group. The photo acid generator is further added to invite the reactive group(s), i.e., cationically polymerizable group, to generate a reaction through irradiation of active energy ray. Below is given an assumed reason why an image recorded with the ink is expected to improve in abrasion resistance and water resistance, with the configuration of the present invention.

The resin particles, used as the polymerizable compound, are formed of a reactive group-containing resin having at least one reactive group selected from the group consisting of an epoxy group, an oxetanyl group and a vinyl ether group. When the photo acid generator produces acid as a result of the ink being irradiated with active energy ray, the reactive group generates a cationic polymerization reaction in which the produced acid acts as polymerization initiator. In contrast to the radical polymerization reactions described in Japanese Patent Application Laid-Open Nos. 2009-132812 and 2011-201973, the cationic polymerization reaction used in the present invention may be hardly inhibited by the presence of oxygen. Therefore, a cured material having a higher degree of polymerization may be readily obtained in the atmosphere. Unlike the highly hydrophilic polymerizable compounds used in Japanese Patent Application Laid-Open Nos. 2009-132812 and 2011-201973, the polymerizable compound added to the ink according to the present invention has the form of resin particles. In case an ink-absorbable recording medium is used, therefore, the polymerizable compound difficult to sink into the recording medium may be abundantly present on the medium surface. The cationic polymerization reaction may advance efficiently when the ink on the recording medium is irradiated with active energy ray, which forms a resin film cross-linked at a higher density. As a result, an image recorded with the ink significantly improves in abrasion resistance.

The polymerizable compounds used in the curable inks described in Japanese Patent Application Laid-Open Nos. 2009-132812 and 2011-201973 are a low-molecular compound having an acid group and a polymer having a hydrophilic block. Thus, these polymerizable compounds are highly hydrophilic. When such a polymerizable compound is used, a resin film produced by the polymerization reaction may be highly hydrophilic as well. Therefore, contact of an obtained image with water may cause the resin to be softened, often undermining water resistance of the image. On the other hand, the polymerizable compound used in the present invention, which has the form of resin particles, is less hydrophilic than the low-molecular compound or hydrophilic block-containing polymer. Then, low hydrophilicity can be kept in the resin film produced by the polymerization reaction, and water resistance of an image to be recorded is markedly improved.

<Ink>

The ink according to the present invention is an aqueous ink of active energy ray curable type for ink jet. The aqueous ink contains resin particles and a photo acid generator. The resin particles include a reactive group-containing resin having at least one reactive group selected from the group consisting of an epoxy group, an oxetanyl group and a vinyl ether group. The components of this ink are hereinafter described.

(Resin Particles)

The ink according to the present invention contains resin particles including a reactive group-containing resin having a reactive group. The reactive group is at least one selected from an epoxy group, an oxetanyl group and a vinyl ether group. The reactive group (hereinafter, may be referred to as "cationically polymerizable reactive group") generates a cationic polymerization. The reactive groups of the reactive group-containing resin may include a radically polymerizable reactive group. The ratio of the cationically polymerizable reactive groups to all of the reactive groups in the reactive group-containing resin (mol %) may preferably be 95.0 mol % or more, or may more preferably be 100.0 mol %.

Examples of the reactive group-containing resin constituting the resin particles may include the following; (1) resins having units derived from monomers (compounds) having ethylenic unsaturated bonds and cationically polymerizable reactive groups, (2) resins in which cationically polymerizable reactive groups are incorporated in various types of resins, and (3) combinations of (1) and (2). When a plurality of types of resins are used as the reactive group-containing resin constituting the resin particles, the resins may be a mixture of resin particles obtained from a single type of resin or resin particles in which different types of resins are combined, or these examples of resin particles may be jointly used. The reactive group-containing resin may contain a hydroxy group, phenyl group, ethylene oxide group or anionic group unless the effects of the present invention are compromised. In this regard, hydrophilic groups including an anionic group, an ethylene oxide group or a hydroxy group may be present in a small amount if they are necessary for stability of the resin particles present in the aqueous ink. The hydrophilic groups, however, may preferably be not overly abundant in view of water resistance of an image to be recorded. Among the hydrophilic groups, the anionic group, even if added in a small amount, may be likely to enhance hydrophilicity of the resin particles. An anionic group-containing resin, if used, may preferably have an acid value of 5 mgKOH/g or less.

The "ethylenic unsaturated bond" described in the monomers (compounds) of (1) is a radically polymerizable reactive group, examples of which may include a vinyl group, an allyl group and a (meth)acryloyl group.

Examples of the compound containing the cationically polymerizable reactive group and vinyl group may include 1,3-butadiene monoepoxide, 1,2-epoxy-4-vinylcyclohexane, glycidyl vinyl ether and 1,4-butanediol monovinyl monoglycidyl ether.

Examples of the compound containing the cationically polymerizable reactive group and allyl group may include allyl vinyl ether, allyl glycidyl ether, o-allyl phenylglycidyl ether, 3-allyloxy methyl-3-ethyl oxetane and 3-allyloxy oxetane.

Compounds containing cationically polymerizable reactive groups and (meth)acryloyl groups refer to "(meth)acrylates having cationically polymerizable reactive groups". Specific examples of such compounds may include glycidyl(meth)acrylate, 4-hydroxybutyl(meth)acrylate glycidyl ether, 3,4-epoxycyclohexylmethyl(meth)acrylate, (3-ethyl-3-oxetanyl)methyl(meth)acrylate and (meth)acrylic acid 2-(2-vinyloxyethoxy)ethyl.

Examples of the resins recited in (2) (including oligomers) may include poly-conjugated dienes, polyethers, urethanes, polydimethyl siloxanes and silsesquioxanes, in which cationically polymerizable reactive groups may be incorporated.

Examples of the poly-conjugated dienes having cationically polymerizable reactive groups may include polybutadiene-type epoxy resins. Any suitable one selected from the commercially available products may be used, for example, DENALEX R-15EPT, FCA-061L and FCA-061M (trade names, manufactured by Nagase ChemteX Corporation).

Examples of the polyethers having cationically polymerizable reactive groups may include bisphenol A-type epoxy resins and bisphenol F-type epoxy resins. The commercially available products may be used, for example, EPICLON 830 and 1050 (trade names, manufactured by DIC Corporation).

Examples of the urethanes having cationically polymerizable reactive groups may include urethane-modified epoxy resins. The commercially available products may be used, for example, ADEKA RESIN EPU-6, EPU-7N, EPU-11F and EPU-15F (trade names, manufactured by ADEKA CORPORATION).

Examples of the polydimethyl siloxanes having cationically polymerizable reactive groups may include epoxy-modified silicone oils. Any suitable one selected from the commercially available products may be used, for example, KF-101, KF-105, X-22-163, X-22-173BX and X-22-9002 (trade names, manufactured by Shin-Etsu Silicone Co., Ltd.).

The silsesquioxanes having cationically polymerizable reactive groups are each a compound in which a cationically polymerizable reactive group is incorporated in an organic group R present in a structure expressed by the composition formula of R—SiO$_{1.5}$ (silsesquioxane structure). Such compounds may be handled as oligomers or resins. The silsesquioxane compounds have organic groups including cationically polymerizable reactive groups and inorganic groups including silsesquioxane units. Thus, properties of organic and inorganic compounds are combined in the silsesquioxane compounds. Such properties may lead to improved abrasion resistance and water resistance of an image to be recorded. Examples of the organic group may include an alkyl group and an aryl group. The cationically polymerizable reactive group may be incorporated in at least one of or all of organic groups in the silsesquioxane compound. Other preferable examples may include silsesquioxane compounds in which polydimethylsiloxane units are incorporated. Reduced water repellency and lower coefficients of friction due to the polydimethylsiloxane unit may conduce to further improvements of abrasion resistance and water resistance of an image to be recorded.

Examples of the silsesquioxane compounds having cationically polymerizable reactive groups may include silsesquioxane compounds having oxetanyl groups (trade names OX-SQ, TX-100, OX-SQ HDX and SI-20, manufactured by TOAGOSEI CO., LTD.) and silsesquioxane compounds having epoxy groups (trade names COMPOCERAN, SQ506, SQ511, SQ502-8, SQ508 and SQ510, manufactured by Arakawa Chemical Industries, Ltd.). The trade names, "OX-SQ and SI-20", are silsesquioxane compounds having oxetanyl groups and dimethylsiloxane units.

The ratio of a unit having the cationically polymerizable reactive group (% by mass) in the resin particles may preferably be 50.00% by mass or more to 100.00% by mass or less based on the total mass of the resin particles. This ratio, which is used as an indicator of the quantity of a reacting structure, represents the ratio of organic groups ("organic groups R" described above) in the case of silsesquioxane compounds having cationically polymerizable reactive groups. Insofar as the ratio stays within the above-mentioned numerical ranges, the cationic polymerization reaction of the resin particles may adequately advance, which may lead to further improved abrasion resistance and water resistance of an image to be recorded.

The reactive group-containing resin may preferably have at least one of a first unit and a second unit described below, or may more preferably have both of the first and second units. Having one or both of the first and second units may further improve the abrasion resistance and water resistance of an image to be recorded. The first unit is a unit derived from (meth)acrylate having the cationically polymerizable reactive group. The second unit is a unit including the silsesquioxane structure and having an organic group that includes the cationically polymerizable reactive group and an inorganic group that includes a silsesquioxane unit.

For adjustment of physical properties, the reactive group-containing resin may have a unit derived from a monomer including no cationically polymerizable reactive group. Examples of the monomer with no cationically polymerizable reactive group may include monomers having ethylenic unsaturated bonds. Specific examples of such monomers may include: aromatic group-containing monomers including styrene, α-methylstyrene and benzyl(meth)acrylate; alkyl(meth)acrylates including methyl(meth)acrylate and 2-ethylhexyl(meth)acrylate; cycloalkyl(meth)acrylates including cycloalkyl(meth)acrylate; amino group-containing monomers including N,N-dimethylaminoethyl(meth)acrylate; vinyl acetate; and acid group-containing monomers including (meth)acrylic acid. The reactive group-containing resin may have a unit derived from a surfactant having the radically polymerizable reactive group.

In the present invention, the contents of the "unit" and "organic group" in the resin particles of the ink are values indicative of quantities of a predetermined unit and of organic groups present in the ink. Such a content may be calculated by multiplying the content (% by mass) of the resin particles in the ink by the ratio (% by mass) of a predetermined unit or organic groups in the resin particles.

The content (% by mass) of a unit derived from a monomer having the cationically polymerizable reactive group in the ink may preferably be 0.10% by mass or more based on the total mass of the ink. The above-mentioned ratio, which is used as an indicator of the quantity of a reacting structure, represents the organic group ("organic group R") content in the case of a unit derived from a silsesquioxane compound having the cationically polymerizable reactive groups. With the above unit content being less than 0.10% by mass, the cationic polymerization reaction of the resin particles may fail to adequately advance, and a recorded image may be accordingly somewhat degraded in abrasion resistance and water resistance. The content (% by mass) of a unit derived from a monomer having the cationically polymerizable reactive group in the ink may preferably be 20.00% by mass or less, or may more preferably be 5.00% by mass or more to 15.00% by mass or less based on the total mass of the ink.

In the cationically polymerizable reactive group of the resin particles may preferably include both of an epoxy group and an oxetanyl group. The reactive group-containing resin constituting the resin particles may further include at least one of the first unit and the second unit described above. Provided that, among the first unit and the second unit, a content $C_E$ (% by mass) of a unit having the epoxy group and a content $C_O$ (% by mass) of a unit having the oxetanyl group, the following relationship expressed by following formula (1) may preferably be satisfied between these contents. This relationship expressed by following formula (1) being satisfied may promise further enhanced abrasion resistance of an image to be recorded. In the resin particles containing, at predetermined ratios, the epoxy group likely to generate an initiation reaction and the oxetanyl group likely to generate a polymer chain elongating reaction, the cationic polymerization reaction may efficiently start, allowing a higher degree of crosslinking of a resin film to be formed. As a result, an image to be recorded may further improve in abrasion resistance.

$$0.10 \leq C_E/(C_E+C_O) \leq 0.65 \tag{1}$$

The resin particles obtained from the reactive group-containing resin may be produced by a known synthesizing method such as emulsion polymerization. In the synthesizing process, a known surfactant (non-reactive surfactant), for example, may be used to assist the emulsifying function and/or dispersion stability of the resin particles.

As described herein, resin being "water soluble" means that, when the resin is neutralized with alkali equivalent to its acid value, the resin can be present in an aqueous medium without forming any particles having particle sizes measurable by dynamic light scattering. Whether a resin being water-soluble or not may be determined by the following method. First, a liquid (solid content of resin: 10% by mass) is prepared that contains a resin neutralized with alkali (for example, sodium hydroxide, potassium hydroxide) equivalent to its acid value. Next, a sample solution is prepared by 10-fold dilution (based on volume) of the liquid using pure water. When particle sizes of the resin in the sample solution are measured by dynamic light scattering, which founds no particle having any measurable particle size, the resin can be determined as having water solubility. The conditions of measurement set then may be SetZero: 30 seconds, number of measurements performed: three, measurement time: 180 seconds, shape: spherical, and refractivity: 1.59. The equipment for size distribution measurement used then may be selected from particle size analyzers using dynamic light scattering (for example, trade name "UPA-EX150", manufactured by Nikkiso Co., Ltd.). It is to be understood that the equipment and conditions for measurement of particle size distribution are not necessarily limited to those mentioned above.

As described herein, resin being "water-dispersible", i.e., "resin particles" means that the resin is present in an aqueous medium in the form of particles having particle sizes measurable by dynamic light scattering. More specifically, the resin particles are dispersed in the ink, meaning that the resin particles are present in the form of resin emulsion. The content (% by mass) of the resin particles in the ink may preferably be 2.00% by mass or more to 20.00% by mass or less based on the total mass of the ink. The content of the resin particles being less than 2.00% by mass may often lead to a poorly cured resin film and may accordingly result in somewhat degraded abrasion resistance and water resistance of an image to be recorded. The content of the resin particles being more than 20.00% by mass, on the other hand, may undermine stability of ink ejection.

Whether the resin is in the form of "resin particles" may be determined by the following method. First, a liquid (resin content: 10% by mass) is prepared that contains a resin neutralized with alkali (sodium hydroxide, potassium hydroxide) equivalent to its acid value. Next, a sample solution is prepared by 10-fold dilution (based on volume) of the liquid using pure water. When particle sizes of the resin in the sample solution are measured by dynamic light scattering, which founds particles having measurable particle sizes, the resin can be determined as having the form of "resin particles". The conditions of measurement set then may be SetZero: 30 seconds, number of measurements performed: three, measurement time: 180 seconds, shape: spherical, and refractivity: 1.59. The equipment for size distribution measurement used then may be selected from particle size analyzers using dynamic light scattering (for example, trade name "UPA-EX150", manufactured by Nikkiso Co., Ltd.). It is to be understood that the equipment and conditions for measurement of particle size distribution are not necessarily limited to those mentioned above. The neutralized resin is thus used for measurement of particle sizes in order to ascertain whether resin particles can be formed even after the resin is fully neutralized and difficult to transform into particles. Any resin that can take the form of particles under such conditions may certainly be present in the aqueous ink in the form of particles.

The resin particles may preferably have an average particle size (D50) in the range of 50 nm or more to 300 nm or less, or more preferably, in the range of 50 nm or more to 200 nm or less. The average particle size of particles described herein, including the resin particles, is indicative of a 50% cumulative value (D50) of a volume-based particle size distribution. The average particle size (D50) of particles including the resin particles may be measured with, for example, the equipment for size distribution measurement using dynamic light scattering described above under similar conditions.

(Photo Acid Generator)

The ink according to the present invention contains a photo acid generator. The photo acid generator is a compound that absorbs light and produces acid. The acid bonds to oxygen atoms of the cationically polymerizable reactive groups in the resin particles and generates cationic species, which initiates the cationic polymerization. The photo acid generator may be either of a water-soluble photo acid generator or a water-dispersible photo acid generator. The photo acid generator present in the ink may be encapsulated in the resin particles. Thus, the photo acid generator thus encapsulated in the resin particles may be stably present in the ink. In this instance, therefore, the photo acid generator may preferably be water-dispersible. The photo acid generator may preferably be (1) water-dispersible, or (2) water-dispersible and encapsulated in the resin particles in the ink. The photo acid generator thus characterized may be likely to abundantly remain, together with the resin particles, on the surface of a recording medium to which the ink has been applied. The cationic polymerization reaction, therefore, may advance more efficiently. Another reason for use of such a photo acid generator is that the photo acid generator, because of its low hydrophilicity, may be unlikely to adversely affect the water resistance of an image to be recorded.

In the present invention, the photo acid generator being "water-soluble" means that the photo acid generator is soluble in an aqueous medium and may be present in the aqueous medium without forming any particles having measurable particle sizes. On the other hand, the photo acid generator being "water-dispersible" means that the photo acid generator is dispersedly present in an aqueous medium and may be present in the aqueous medium, with measurably large particles being formed. Whether the photo acid generator has water solubility or water dispersibility may be determined by measuring particle sizes under conditions similar to those employed to determine the resin particles described earlier. When particle sizes in a sample solution containing the photo acid generator (content of photo acid generator: 1% by mass) are measured by dynamic light scattering and particles having particle sizes are measured, the photo acid generator may be determined as having "water dispersibility". When no particle having any measurable particle size is measured, the photo acid generator may be determined as having "water solubility".

The photo acid generator may be selected from the known photo acid generators including salts of onium ions and anions. Examples of the onium ions may include sulfonium ions, iodonium ions, selenium ions, ammonium ions and phosphonium ions.

Examples of the sulfonium ions may include aryl sulfonium ions, specifically, triphenyl sulfonium ion, tri-p-tolylsulfonium ion, tri-o-tolylsulfonium ion, tris(4-methoxyphenyl)sulfonium ion, 1-naphthyldiphenyl sulfonium ion, diphenylphenacyl sulfonium ion, phenylmethylbenzyl sulfonium ion, 4-hydroxyphenylmethyl benzyl sulfonium ion, dimethylphenacyl sulfonium ion and phenacyltetrahydrothiophenium ion.

Examples of the iodonium ions may include aryl iodonium ions, specifically, diphenyl iodonium ion, di-p-tolyl iodonium ion, bis(4-dodecylphenyl)iodonium ion, bis(4-methoxyphenyl)iodonium ion and (4-octyloxyphenyl) phenyl iodonium ion.

Examples of the selenium ions may include aryl selenium ions, specifically, triphenyl selenium ion, tri-p-tolyl selenium ion, tri-o-tolyl selenium ion, tris(4-methoxyphenyl) selenium ion, 1-naphthyldiphenyl selenium ion, tris(4-fluorophenyl)selenium ion, tri-1-naphthyl selenium ion and tri-2-naphthyl selenium ion.

Examples of the ammonium ions may include alkyl ammonium ions specifically, tetramethyl ammonium ion, ethyltrimethyl ammonium ion, diethyldimethyl ammonium ion, triethylmethyl ammonium ion, tetraethyl ammonium ion, trimethyl-n-propyl ammonium ion, trimethylisopropyl ammonium ion, trimethyl-n-butyl ammonium ion and trimethylisobutyl ammonium ion.

Examples of the phosphonium ions may include aryl phosphonium ions, specifically, tetraphenyl phosphonium ion, tetra-p-tolyl phosphonium ion, tetrakis(2-methoxyphenyl)phosphonium ion, triphenylbenzyl phosphonium ion, triphenylphenacyl phosphonium ion, triphenylmethyl phosphonium ion, triethylbenzyl phosphonium ion and tetraethyl phosphonium ion.

Examples of the anions may include: halide ions; anion of acids including sulfonic acid, nitric acid, boric acid, phosphoric acid, carboxylic acid, trifluoromethanesulfonic acid, tetrafluoroboric acid, hexafluorophosphoric acid and fluoroantimonic acid, and derivatives of the above-mentioned acids.

Examples of the water-soluble photo acid generators may include diphenyl-o-methylphenylsulfonium p-toluene sulfonate, diphenyl-m-methylphenyl sulfonium p-toluene sulfonate, diphenyl-2,4,6-trimethylphenyl sulfonium p-toluene sulfonate, diphenyl-2,4-dimethylphenyl sulfonium p-toluene sulfonate, diphenyl-o-methylphenyl sulfonium benzene sulfonate, diphenyl-o-ethylphenyl sulfonium p-toluene sulfonate, diphenyliodonium chloride, diphenyliodonium tetrafluoroborate, diphenyliodonium trifluoromethanesulfonate and diphenyliodonium p-toluene sulfonate.

Examples of the water-dispersible photo acid generators may include 4-isopropyl-4'-methyldiphenyl iodoniumtetrakis(pentafluorophenyl)borate, diphenyl-p-methylphenylsulfonium trifluoromethanesulfonate, diphenyl(4-methoxyphenyl)sulfonium trifluoromethanesulfonate, diphenyl-p-methylphenylsulfonium nonafluorobutanesulfonate and tri-p-tolylsulfonium nonafluorobutanesulfonate. When such a water-dispersible photo acid generator is used to prepare the aqueous ink, an aqueous dispersion liquid prepared as follows may preferably be used. A photo acid generator is dissolved in an organic solvent to prepare a solution. This solution is mixed with water containing a component that assists dispersion, and the photo acid generator is dispersed with a dispersing device. Then, the organic solvent is distilled off under reduced pressure to obtain an aqueous dispersion liquid. Examples of the component that assists dispersion may include the known surfactants and emulsifiers. Preferable examples of the dispersing device may include ultrasonic homogenizers and high-pressure homogenizers, because particle sizes are readily adjustable by such devices.

The photo acid generator may preferably be selected from aryl sulfonium salts that excel in thermal stability and photosensitivity and also excel in efficiency of acid production. These salts having such favorable properties may accelerate the cationic polymerization reaction and are expected to further improve the abrasion resistance of an image to be recorded. The commercially available products of the aryl sulfonium salts may include trade name "WPAG-367" (manufactured by Wako Pure Chemical Co., Ltd.), trade name "CPI-410S" (manufactured by San-Apro Ltd.) and trade name "Irgacure 290" (manufactured by BASF Corporation).

The content (% by mass) of the photo acid generator in the ink may preferably be, based on the total mass of the ink, 0.10% by mass or more to 10.00% by mass or less, or may more preferably be 0.30% by mass or more to 5.00% by mass or less. The content of the photo acid generator being less than 0.10% by mass may lead to a poorly cured resin film and may accordingly result in somewhat degraded abrasion resistance and water resistance of an image to be recorded. The content of the photo acid generator being more than 10.00% by mass, on the other hand, may rather undermine stability of ink ejection.

The resin particles further including at least one of the first unit and the second unit described earlier may preferably satisfy the following relationship. The mass ratio of the content (% by mass) of the photo acid generator may preferably be 0.05 times or more to 0.50 times or less to a total of the content (% by mass) of the first unit and the content (% by mass) of the organic groups in the second unit. The mass ratio being less than 0.05 times may lessen cations producible by irradiation of active energy ray. This may compromise efficient progress of the cationic polymerization reaction, possibly failing to improve the image abrasion resistance and water resistance as effectively as expected. The mass ratio being more than 0.50 times may lessen cationically polymerizable groups engaged in crosslinking. This may compromise efficient progress of the cationic polymerization reaction, possibly failing to improve the image abrasion resistance and water resistance as effectively as expected.

The components added to the ink, such as the photo acid generator, may be confirmed as described below. It is to be understood that the following method is just an example. In the method described below, the components are extracted from the ink and then analyzed, however, the components extracted from the dispersion liquid and aqueous solution are also similarly analyzable.

The water-dispersible components are separated from the ink containing the resin particles by density gradient separation methods. Of the density gradient centrifugation methods, the rate zonal centrifugation method extracts the water-dispersible components by separating them as sediment according to a difference between sedimentation coefficients of the components, while the equilibrium centrifugation method extracts the water-dispersible components by separating them as sediment according to a difference between densities of the components. The resin particles are included in the sediment. The water-dispersible photo acid generator is included in the sediment, while the water-soluble photo acid generator is included in a supernatant fluid.

The water-soluble photo acid generator may be analyzed as described below. The supernatant fluid is collected and dispensed to prepare a sample (aqueous solution or dried solid matter) suitable for a method of analysis subsequently performed. The component analysis is then performed, in which the ink currently analyzed is determined as containing the "water-soluble photo acid generator" when the sample includes the photo acid generator. Examples of the component analysis may include gel permeation chromatography, liquid chromatography-mass spectrometry, ion chromatography, nuclear magnetic resonance spectroscopy, matrix-assisted laser desorption ionization mass spectrometry, inductively coupled plasma-atomic emission spectroscopy, inductively coupled plasma-atomic mass spectrometry, ultraviolet-visible spectroscopy, infrared spectroscopy and X-ray crystallographic analysis.

The sediment analysis may be performed as follows. The density gradient separation methods separate the components in layers, which are then collected and dispensed in an appropriate manner and cleaned, if necessary, to prepare a sample (aqueous solution or dried solid matter) suitable for a method of analysis subsequently performed. The components in the sample are qualitatively and quantitatively analyzed by any suitable one of the above-mentioned component analysis techniques. The resin constituting the resin particles may be compositionally identified by analyzing the depolymerized monomer using pyrolysis gas chromatography. Then, the ink currently analyzed may be determined as containing the "resin particles encapsulating the water-dispersible photo acid generator", when the sample is found to include the photo acid generator and reactive group-containing resin. In case the sample does not include the reactive group-containing resin but includes the photo acid generator, the ink currently analyzed may be determined as containing the water-dispersible photo acid generator (no encapsulated in resin particles).

(Coloring Material)

The coloring material added to the ink may be selected from pigments and dyes. The content (% by mass) of the coloring material in the ink may preferably be, based on the total mass of the ink, 0.10% by mass or more to 15.00% by mass or less, or may more preferably be 1.00% by mass or more to 10.00% by mass or less.

Specific examples of the pigments may include: inorganic pigments like carbon black and titanium oxide; and organic pigments like azo, phthalocyanine, quinacridone, isoindolinone, imidazolone, diketopyrrolopyrrole and dioxazine.

For dispersion of the pigment, resin-dispersed pigments containing resin as dispersant, and self-dispersed pigments in which hydrophilic groups are bonded to surfaces of pigment particles may be used. Other useable pigments may include resin-bonded pigments in which resin-containing organic groups are chemically bonded to surfaces of pigment particles, and microencapsulated pigments in which surfaces of pigment particles are coated with resin. Of these examples, resin-dispersed pigments in which resin; dispersant, is physically adsorbed to surfaces of pigment particles may be preferred over the resin-bonded pigments and micro-encapsulated pigments.

The resin dispersant that makes the pigment dispersed in an aqueous medium may preferably be selected from resins that allow pigments to be dispersed in an aqueous medium under the action of anionic groups. Examples of the resin dispersant may include acrylic resins and urethane resins. Of these examples, acrylic resins may be preferred. Among the acrylic resins, ones including hydrophilic and hydrophobic units as compositional units may be more preferable.

The hydrophilic unit is a unit having a hydrophilic group, for example, anionic group, hydroxy group and/or ethylene oxide group. The hydrophilic unit is formable by, for example, polymerizing a hydrophilic group-containing monomer. Specific examples of the hydrophilic group-containing monomer may include: acid monomers having carboxylic acid groups, for example, (meth)acrylic acid, itaconic acid, maleic acid or fumaric acid; anionic monomers including anhydrides and salts of the above-mentioned acid monomers; monomers having hydroxy groups, for example, 2-hydroxyethyl(meth)acrylate or 3-hydroxypropyl(meth)acrylate; and monomers having ethylene oxide groups, for example, methoxy(mono, di, tri, poly)ethylene glycol(meth)acrylate. Examples of cations constituting the salts of acid monomers may include lithium ion, sodium ion, potassium ion, ammonium ion and organic ammonium ion.

The hydrophobic unit is a unit having no hydrophilic group, for example, anionic group, hydroxy group or ethylene oxide group. The hydrophobic unit is formable by, for example, polymerizing a hydrophobic monomer having no hydrophilic group. Specific examples of the hydrophobic monomer may include: monomers having aromatic groups, for example, styrene, α-methyl styrene or benzyl(meth)acrylate; and monomers having aliphatic groups, for example, ethyl(meth)acrylate, methyl(meth)acrylate, (iso-)propyl(meth)acrylate, (n-, iso-, t-)butyl(meth)acrylate or 2-ethylhexyl(meth)acrylate.

The resin dispersant may preferably have a hydrophilic unit derived from (meth)acrylic acid and a hydrophobic unit derived from a monomer having an aliphatic group or aromatic group. Such resin dispersants may be suitable because they readily interact with pigments.

The weight-average molecular weight of the resin dispersant may preferably be 1,000 or more to 30,000 or less, or may more preferably be 3,000 or more to 15,000 or less. The weight-average molecular weight of the resin dispersant is a polystyrene-converted value measured by gel permeation chromatography (GPC). The acid value of the resin dispersant may preferably be 80 mgKOH/g or more to 250 mgKOH/g or less, or may more preferably be 100 mgKOH/g or more to 200 mgKOH/g or less. The content (% by mass) of the resin dispersant in the ink may preferably be 0.50% by mass or more to 1.00% by mass or less based on the total mass of the ink. The content (% by mass) of the resin dispersant in the ink, expressed by mass ratio, may preferably be 0.10 times or more to 0.30 times or less of the pigment content (% by mass).

(Aqueous Medium)

The ink according to the present invention is an aqueous ink containing an aqueous medium which is a mixture of water and a water-soluble organic solvent. The water used then may preferably be deionized water (ion-exchanged water). The water content (% by mass) in the ink may preferably be 50.00% by mass or more to 95.00% by mass or less based on the total mass of the ink.

The water-soluble organic solvent may be selected from the known water-soluble organic solvents conventionally used in aqueous inks for ink jet. Examples of the water-soluble organic solvents may include monovalent alcohols, multivalent alcohols, alkylene glycols having alkylene groups having approximately 1 to 4 carbon atoms, polyethylene glycols having number-average molecular weights of approximately 200 to 2,000, glycol ethers and nitrogen-containing compounds. The content (% by mass) of the water-soluble organic solvent in the ink may preferably be 3.00% by mass or more to 50.00% by mass or less based on the total mass of the ink.

(Other Components)

If necessary, the ink may include, in addition to the above-mentioned components, any one(s) of the following additives; a surfactant, a pH adjuster, a rust inhibitor, an antiseptic, a fungicide, an antioxidant, an anti-reduction agent, an evaporation accelerator, a chelating agent and a water-soluble resin.

<Ink Cartridge>

Figure 1:
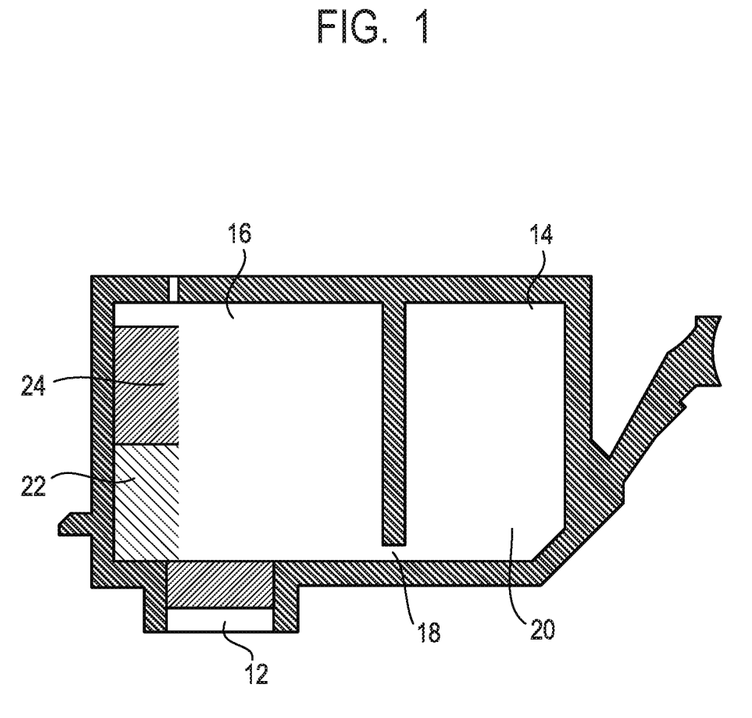
FIG. 1 is a cross-sectional view schematically illustrating an embodiment of an ink cartridge according to the present invention.

The ink cartridge according to the present invention includes an ink and an ink storage portion for storing the ink. The ink stored in the ink storage portion is the ink according to the present invention described above. FIG. 1 is a cross-sectional view schematically illustrating an ink cartridge according to an embodiment of the present invention. As illustrated in FIG. 1, the ink cartridge has, on its bottom surface, an ink supply port 12 through which the ink is supplied to a recording head. Inside of the ink cartridge is the ink storage portion. The ink storage portion includes an ink storage chamber 14 and an absorber storage chamber 16, and these chambers are in communication with each other through a communication port 18. The absorber storage chamber 16 communicates with the ink supply port 12. The ink storage chamber 14 is containing an ink 20. The absorber storage chamber 16 has absorbers 22 and 24 impregnated with and retaining the ink. The ink storage portion may have the whole liquid ink absorbed and retained by the absorbers without the ink storage chamber. The ink storage portion may be configured to retain the whole ink in liquid form without the absorbers. The ink cartridge may be mounted with a recording head in addition to the ink storage portion.

<Ink Jet Recording Method>

The ink jet recording method according to the present invention includes an ink applying step and an irradiating step. The ink applying step is a step of ejecting the ink according to the present invention from a recording head of ink jet system onto a recording medium. The irradiating step is a step of irradiating the ink on the recording medium with active energy ray so as to trigger the reactive groups of the resin particles to generate the reaction and thereby induce polymerization between the resin particles. In the ink jet recording method according to the present invention, the irradiating step follows the ink applying step. The recording method may further include a drying step of heating and drying the ink on the recording medium. Either one of the irradiating step or the drying step may be performed earlier or later than the other, or these steps may be performed in plural stages.

The ink may be ejected by applying a dynamic energy or a thermal energy to the ink. In the present invention, the ink may preferably be subjected to a thermal energy to be ejected.

Examples of the active energy ray irradiation to cure the ink may include electron beam, ultraviolet light, visible light and X-ray. Of these examples, ultraviolet light irradiation is preferable. Suitable ultraviolet light sources may include a mercury lamp, a metal halide lamp, an excimer laser, an ultraviolet laser, a cold-cathode tube, a hot-cathode tube, black light and a Light Emitting Diode (LED). The amount of ultraviolet irradiation may preferably be 10 mJ/cm$^2$ or more to 5,000 mJ/cm$^2$ or less. The duration of ultraviolet irradiation may preferably be one second or more to 60 seconds or less.

The ink may be dried by any suitable known means, for example, heating, air drying or combination of heating and air drying. The heating temperature used then may preferably be selected from degrees in the range of 30° C. or more to 100° C. or less. When air drying is selected, an air blow speed set then may preferably be 1 msec. or more to 10 msec. or less. The duration of drying may preferably be one second or more to 60 seconds or less.

Figure 2A:
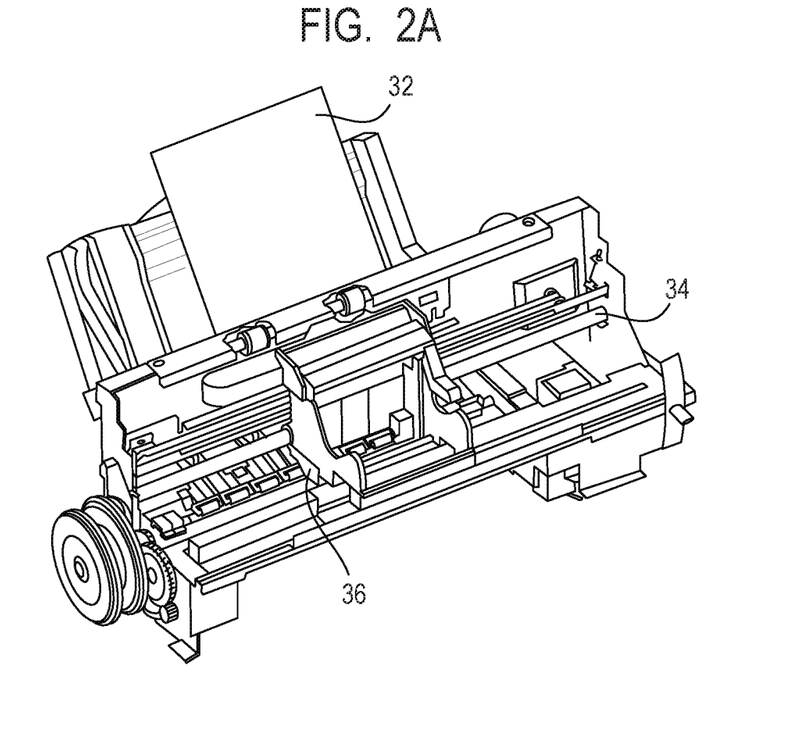
FIG. 2A is a perspective view of a main unit of the ink jet recording apparatus and FIG. 2B is a perspective view of a head cartridge.
Figure 2B:
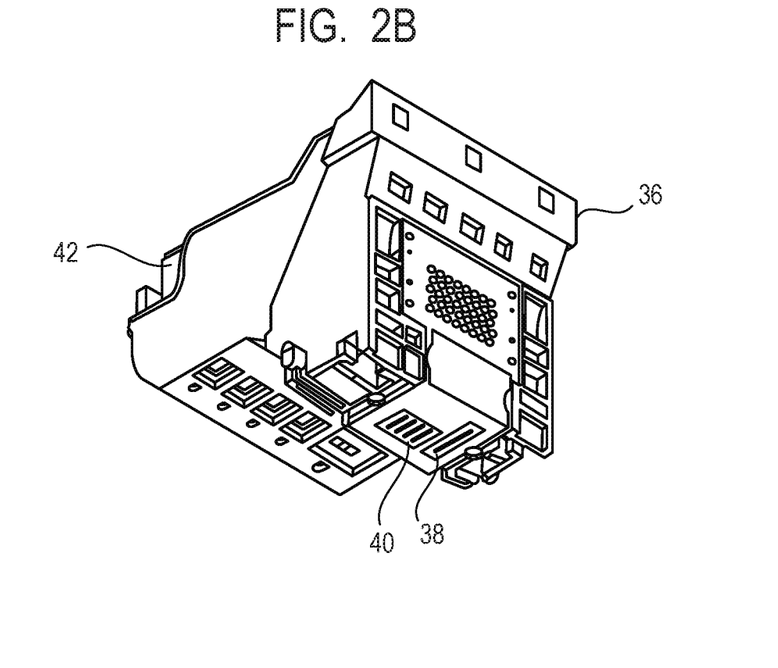

FIGS. 2A and 2B are schematic views of an ink jet recording apparatus used in the ink jet recording method according to the present invention; and FIG. 2A is a perspective view of a main unit of the ink jet recording apparatus and FIG. 2B is a perspective view of a head cartridge. The ink jet recording apparatus is equipped with a conveying unit (not shown) that conveys a recording medium 32 and a carriage shaft 34. The head cartridge 36 is mountable on the carriage shaft 34. The head cartridge 36 has recording heads 38 and 40 is so structured that the ink cartridge 42 can be fitted therein. While the head cartridge 36 is being conveyed along the carriage shaft 34 in a main scanning direction, the ink (not shown) is ejected from the recording heads 38 and 40 toward the recording medium 32. The recording medium 32 is conveyed by a conveying unit (not shown) in a sub scanning direction. As a result, an image is recorded on the recording medium 32. Examples of the recording medium may include ink-nonabsorbable mediums like glass mediums and plastic sheets, and ink-absorbable (readily absorbable, less absorbable) mediums like paper. Particularly preferable mediums may be ink-absorbable recording mediums including recording mediums with no coating layer like plain paper, glossy paper, matte paper and coating layer-formed recording mediums like slightly coated paper.

EXAMPLES

The present invention is hereinafter described in further detail using examples and comparative examples. The present invention, however, is not necessarily limited to any examples described below and may be modified otherwise unless such modifications depart from the technical aspects of the present invention. Any terms described herein in reference to the amounts of components, for example, "part" and "%" refer to mass-based values, unless specified otherwise.

<Conditions for Measurement of Particle Sizes>

The particle sizes of particles prepared as described below (dispersed particles of photo acid generator, resin particles) are 50% cumulative values (D50) of a volume-based particle size distribution. The value D50 was measured with a particle size analyzer using dynamic light scattering (trade name: "UPA-EX150", manufactured by Nikkiso Co., Ltd.) under the following conditions; SetZero: 30 seconds, number of measurements performed: three; measurement time: 180 seconds; shape: spherical; and refractivity: 1.59.

<Preparation of Pigment Dispersion Liquid>

(Pigment Dispersion Liquid 1)

The following materials were mixed; 16.0 parts of a pigment (carbon black), 50.0 parts of an aqueous solution (resin content of 20.0%) prepared by neutralizing a styrene-acrylic acid copolymer with a 10% sodium hydroxide aqueous solution, and 35.0 parts of ion-exchanged water. The styrene-acrylic acid copolymer used then had the acid value of 100 mgKOH/g and the weight-average molecular weight of 10,000. After the mixed materials were dispersed for two minutes with a batch-type vertical sand mill, coarse particles were removed by centrifugal separation. The resulting mixture was filtered under pressure with a microfilter of 3.0 μm in pore size (manufactured by FUJIFILM Corporation), and a pigment dispersion liquid 1 was obtained. In the pigment dispersion liquid 1, the pigment content was 16.0%, and the resin content was 10.0%.

(Pigment Dispersion Liquid 2)

A pigment dispersion liquid 2 was prepared similarly to the pigment dispersion liquid 1, with the exception that C.I. pigment blue 15:3 was used as the pigment. In the pigment dispersion liquid 2, the pigment content was 16.0%, and the resin content was 10.0%.

(Pigment Dispersion Liquid 3)

A pigment dispersion liquid 3 was prepared similarly to the pigment dispersion liquid 1, with the exception that C.I. pigment red 122 was used as the pigment. In the pigment dispersion liquid 3, the pigment content was 16.0%, and the resin content was 10.0%.

(Pigment Dispersion Liquid 4)

A pigment dispersion liquid 4 was prepared similarly to the pigment dispersion liquid 1, with the exception that C.I. pigment yellow 74 was used as the pigment. In the pigment dispersion liquid 4, the pigment content was 16.0%, and the resin content was 10.0%.

<Preparation of Dispersion Liquid of Photo Acid Generator>

(Dispersion Liquid of Photo Acid Generator 1)

A solution A was prepared by dissolving 3.00 parts of a photo acid generator 1 (water-dispersible aryl sulfonium salt, trade name "CPI-410S", manufactured by San-Apro Ltd.) in 47.00 parts of ethyl acetate. A solution B was prepared by dissolving 0.30 part of a nonionic surfactant (polyoxyalkylene-branched decylether, trade name: "NOIGEN XL-1000", manufactured by DKS Co., Ltd.) in 100.00 parts of pure water. The solution B was added to the solution A and stirred well. Then, this mixture was subjected to ultrasonic treatment using an ultrasonic homogenizer (trade name: "Digital Sonifier 450DA", manufactured by Branson Ultrasonics, Emerson Japan, Ltd.) to emulsify the components. As a result, an emulsified solution was obtained. The conditions for ultrasonic treatment set then were; amplitude: 76 μm, output: 50 W, frequency: 20 kHz and duration: 30 minutes. The water content was adjusted after the ethyl acetate was distilled off from the obtained emulsified solution under reduced pressure. As a result, a dispersion liquid containing the photo acid generator 1 in the content of 10.0% was obtained. The particle sizes of the photo acid generator 1 in the dispersion liquid were 120 nm.

(Dispersion Liquid of Photo Acid Generator 2)

A dispersion liquid containing the photo acid generator 2 in the content of 10.0% was prepared similarly to the case of the photo acid generator 1 with the exception that the photo acid generator 2 was used instead of the photo acid generator 1. The photo acid generator 2 used then was a water-dispersible aryl sulfonium salt (trade name: "Irgacure 290", manufactured by BASF Corporation). The particle sizes of the photo acid generator 2 in the dispersion liquid were 145 nm.

(Dispersion Liquid of Photo Acid Generator 3)

A dispersion liquid containing the photo acid generator 3 in the content of 10.0% was prepared similarly to the case of the photo acid generator 1 with the exception that the photo acid generator 3 was used instead of the photo acid generator 1. The photo acid generator 3 used then was a water-dispersible aryl iodonium salt (4-isopropyl-4'-methyldiphenyl iodonium tetrakis(pentafuluorophenyl)borate, manufactured by TOKYO CHEMICAL INDUSTRY CO., LTD.) The average particle size of the photo acid generator 3 in the dispersion liquid was 133 nm.

<Synthesis of Resin Particles>

(Resin Particles 1-7, 10-17, 19)

The following materials were put in a beaker and stirred well; the components in upper-side columns of Table 1 (unit: part), 25.00 parts of ethyl acetate (solvent), and 0.10 part of a radical polymerization initiator (azobisisobutyronitrile, manufactured by Fujifilm Wako Pure Chemical Corporation). Apart from that, a solution was prepared by dissolving 0.75 part of a surfactant (dodecyl sodium sulfate, manufactured by TOKYO CHEMICAL INDUSTRY CO., LTD.) in 100.00 parts of ion-exchanged water. Then, this solution was dripped into the beaker and stirred well. The mixture in the beaker was subjected to ultrasonic treatment using an ultrasonic homogenizer for 15 minutes under the following conditions; amplitude: 76 μm, output: 55 W, and frequency: 20 kHz to emulsify the components. As a result, an emulsified solution was obtained. The organic solvent was distilled off from the emulsified solution under reduced pressure to obtain a mixture. The obtained mixture was put in a flask equipped with a stirrer, a nitrogen introducing tube, a reflux condenser, and a temperature gauge. Then, the flask was heated to 75° C. in a nitrogen atmosphere, and the mixture, while being stirred, was radically polymerized for two hours to synthesize resin particles. Then, the flask was cooled to 25° C., and the water content was adjusted to adjust the content of resin particles in the dispersion liquid to 20.00%. Thus, resin particle dispersion liquids were obtained. In Table 1, lower-side columns show particle sizes of the resin particles and contents of resin particles, photo acid generator, first unit, organic groups in the second unit, epoxy group-having unit and oxetanyl group-having unit. The photo acid generators 1 to 3 used for synthesis of the resin particles were the same as those used to prepare the dispersion liquids of the photo acid generators.

The following is specifics of the components constituting the first unit used for synthesis of the resin particles.

3,4-epoxycyclohexylmethyl methacrylate, trade name: "CYCLOMER M100", manufactured by DAICEL CORPORATION), 4-hydroxybutyl acrylate glycidyl ether, trade name: "4-HBAGE", manufactured by Mitsubishi Chemical Corporation), (3-ethyl-3-oxetanyl)methyl acrylate, trade name: "OXE-10", manufactured by OSAKA ORGANIC CHEMICAL INDUSTRY LTD.), and 2-(2-vinyloxyethoxy)ethyl acrylate, trade name: "VEEA", manufactured by NIPPON SHOKUBAI CO., LTD.).

The following is specifics of the components constituting the second unit used for synthesis of the resin particles.

Silsesquioxane compound 1: oxetanyl group-having silsesquioxane, trade name "OX-SQ SI-20", functional group equivalent of 262 g/mol, manufactured by TOAGOSEI CO., LTD.), Silsesquioxane compound 2: oxetanyl group-having silsesquioxane, trade name "OX-SQ TX-100", functional group equivalent of 209 g/mol, manufactured by TOAGOSEI CO., LTD.), Silsesquioxane compound 3: 1-butoxy-2-propanol solution of oxetanyl group-having silsesquioxane (solid content of 50%), trade name "OX-SQ HDX", functional group equivalent of 287 g/mol, manufactured by TOAGOSEI CO., LTD.), and Silsesquioxane compound 4: isopropanol/toluene solution of epoxy group-having silsesquioxane (solid content of 72%), organic content of 65%, inorganic content of 35%, trade name: "COMPOCERAN SQ502-8", manufactured by Arakawa Chemical Industries, Ltd.).

The content of organic group in the second unit (i.e., content of oxetanyl group) was calculated by the following formula for a respective one of resin particle dispersion liquids prepared from the silsesquioxane compounds 1 to 3. In the silsesquioxane compounds 1 to 3, the organic group is "2-(3-ethyl-3-oxetanyl)methoxyethyl group" having the molecular weight of 157.23 g/mol.

Content of organic group (%) in second unit=content of resin particles (%)×molecular weight of organic groups $R$ (g/mol)/functional group equivalent (g/mol)

The content of organic group in the second unit (i.e., content of epoxy group) was calculated by the following formula for the resin particle dispersion liquid prepared from the silsesquioxane compound 4. The "organic content" in the silsesquioxane compound 4 is the mass ratio (%) of organic groups in this compound.

Content (%) of organic groups in second unit=content (%) of resin particles×organic content (%)/100(%).

exchanged water. This solution was dripped into the beaker and stirred well. The mixture in the beaker was subjected to ultrasonic treatment using an ultrasonic homogenizer for 30 minutes under the following conditions; amplitude: 76 μm, output: 55 W, and frequency: 20 kHz to emulsify the components. As a result, an emulsified solution was

TABLE 1

Conditions of synthesis and properties of resin particles 1 to 7, 10 to 17, 19

| | Resin particles | | | | | | | |
|---|---|---|---|---|---|---|---|---|
| | 1 | 2 | 3 | 4 | 5 | 6 | 7 | 10 |
| Glycidyl methacrylate | | 12.50 | | | | 12.50 | | |
| 3,4-Epoxycyclohexylmethyl methacrylate | 10.00 | | | | 10.00 | | 10.00 | 12.50 |
| 4-Hydroxybutyl acrylate glycidyl ether | | | 12.50 | | | | | |
| (3-Ethyl-3-oxetanyl)methyl acrylate | | | | 12.50 | | | | 12.50 |
| 2-(2-Vinyloxyethoxy)ethyl acrylate | | | | | | | | |
| Butyl methacrylate | | | | | | | | |
| Silsesquioxane compound 1 | 15.00 | | | | 15.00 | | 15.00 | |
| Silsesquioxane compound 2 | | 12.50 | | | | 12.50 | | |
| Silsesquioxane compound 3 | | | 25.00 | | | | | |
| Silsesquioxane compound 4 | | | | 17.36 | | | | |
| Photo acid generator 1 | | | | 2.50 | | 2.50 | | |
| Photo acid generator 2 | | | 2.50 | | 2.50 | | | |
| Photo acid generator 3 | | | | | | | 2.50 | |
| Epoxy resin | | | | | | | | |
| Particles sizes of resin particles (nm) | 112 | 133 | 151 | 127 | 142 | 130 | 145 | 115 |
| Content of resin particles $C_R$(%) | 20.00 | 20.00 | 20.00 | 20.00 | 20.00 | 20.00 | 20.00 | 20.00 |
| Content of photo acid generator $C_P$(%) | 0.00 | 0.00 | 2.00 | 2.00 | 2.00 | 2.00 | 2.00 | 0.00 |
| Content of first unit $C_{U1}$(%) | 8.00 | 10.00 | 10.00 | 10.00 | 8.00 | 10.00 | 8.00 | 20.00 |
| Content of organic group in second unit $C_{U2}$(%) | 7.20 | 7.52 | 5.48 | 6.50 | 7.20 | 7.52 | 7.20 | 0.00 |
| Content of epoxy group-having unit $C_E$(%) | 8.00 | 10.00 | 10.00 | 6.50 | 8.00 | 10.00 | 8.00 | 10.00 |
| Content of oxetanyl group-having unit $C_O$(%) | 7.20 | 7.52 | 5.48 | 10.00 | 7.20 | 7.52 | 7.20 | 10.00 |

| | Resin particles | | | | | | | |
|---|---|---|---|---|---|---|---|---|
| | 11 | 12 | 13 | 14 | 15 | 16 | 17 | 19 |
| Glycidyl methacrylate | | | | | | | | |
| 3,4-Epoxycyclohexylmethyl methacrylate | | 10.00 | 1.00 | 1.50 | 13.30 | 15.00 | | |
| 4-Hydroxybutyl acrylate glycidyl ether | | | | | | | | |
| (3-Ethyl-3-oxetanyl)methyl acrylate | | | | | | | 12.50 | |
| 2-(2-Vinyloxyethoxy)ethyl acrylate | 25.00 | | | | | | | |
| Butyl methacrylate | | | | | | | | 25.00 |
| Silsesquioxane compound 1 | | 15.00 | 24.00 | 23.50 | 11.70 | 10.00 | | |
| Silsesquioxane compound 2 | | | | | | | 12.50 | |
| Silsesquioxane compound 3 | | | | | | | | |
| Silsesquioxane compound 4 | | | | | | | | |
| Photo acid generator 1 | | 7.50 | | | | | | |
| Photo acid generator 2 | | | | | | | | |
| Photo acid generator 3 | | | | | | | | |
| Epoxy resin | | | | | | | | |
| Particles sizes of resin particles (nm) | 85 | 152 | 131 | 126 | 103 | 106 | 98 | 88 |
| Content of resin particles $C_R$(%) | 20.00 | 20.00 | 20.00 | 20.00 | 20.00 | 20.00 | 20.00 | 20.00 |
| Content of photo acid generator $C_P$(%) | 0.00 | 6.00 | 0.00 | 0.00 | 0.00 | 0.00 | 0.00 | 0.00 |
| Content of first unit $C_{U1}$(%) | 20.00 | 8.00 | 0.80 | 1.20 | 10.64 | 12.00 | 10.00 | 0.00 |
| Content of organic group in second unit $C_{U2}$(%) | 0.00 | 7.20 | 11.52 | 11.28 | 5.62 | 4.80 | 7.52 | 0.00 |
| Content of epoxy group-having unit $C_E$(%) | 0.00 | 8.00 | 0.80 | 1.20 | 10.64 | 12.00 | 0.00 | 0.00 |
| Content of oxetanyl group-having unit $C_O$(%) | 0.00 | 7.20 | 11.52 | 11.28 | 5.62 | 4.80 | 17.52 | 0.00 |

(Resin Particles 8, 9, 18)

The components in upper-side columns of Table 2 (unit: part) and 37.50 parts of ethyl acetate (solvent) were put in a beaker and stirred well. The epoxy resin used then was a bisphenol A epoxy resin (trade name: "EPICLON 1050", manufactured by DIC Corporation). Apart from that, a solution was prepared by dissolving 0.50 part of a surfactant (dodecyl sodium sulfate, manufactured by TOKYO CHEMICAL INDUSTRY CO., LTD.) in 100 parts of ion-exchanged water. This solution was dripped into the beaker and stirred well. The mixture in the beaker was subjected to ultrasonic treatment using an ultrasonic homogenizer for 30 minutes under the following conditions; amplitude: 76 μm, output: 55 W, and frequency: 20 kHz to emulsify the components. As a result, an emulsified solution was obtained. The organic solvent was distilled off from the obtained emulsified solution under reduced pressure to obtain resin particles. Then, the water content was adjusted to adjust the content of resin particles in the dispersion liquid to 20.00%. Thus, resin particle dispersion liquids were obtained. In Table 2, lower-side columns show particle sizes of the resin particles and contents of resin particles, photo acid generator, first unit, organic groups in the second unit, epoxy group-having unit and oxetanyl group-having unit.

TABLE 2

Conditions of synthesis and properties of resin particles 8, 9, 18

| | Resin particles | | |
|---|---|---|---|
| | 8 | 9 | 18 |
| Silsesquioxane compound 3 | 15.00 | 25.00 | |
| Silsesquioxane compound 4 | 6.94 | | |
| Epoxy resin | | | 12.50 |
| Particles sizes of resin particles (nm) | 174 | 153 | 203 |
| Content of resin particles $C_R$ (%) | 20.00 | 20.00 | 20.00 |
| Content of photo acid generator $C_P$ (%) | 0.00 | 0.00 | 0.00 |
| Content of first unit $C_{U1}$ (%) | 0.00 | 0.00 | — |
| Content of organic groups in second unit $C_{U2}$ (%) | 11.77 | 10.96 | — |
| Content of epoxy group-having unit $C_E$ (%) | 5.20 | 0.00 | — |
| Content of oxetanyl group-having unit $C_O$ (%) | 6.58 | 10.96 | 0.00 |

(Resin 20)

According to the example of synthesis 1 described in Japanese Patent Application Laid-Open No. 2011-201973, a "photo-radically polymerizable polymer micelle solution" was prepared and used as a liquid containing the resin 20. In the resin 20, a photopolymerization initiator (radical photo-polymerization initiator) was encapsulated in the micelle of poly(ethylene glycol)-poly(benzyl methacrylate-co-acryloylated glycidyl methacrylate). In the resin 20 (micelle), the particle sizes were 220 nm, resin content was 16.50%, and photo-polymerization initiator content was 0.83%.

<Preparation of Inks>

(Inks 1 to 28, 30)

The components in upper-side columns of Table 3 were mixed and stirred well and then filtered under pressure through a microfilter of 0.45 μm in pore size (manufactured by FUJIFILM Corporation) to prepare different inks. Of the components in Table 3, the photo acid generator 4 was a water-soluble aryl sulfonium salt; diphenyl-2,4,6-trimethylphenyl sulfonium p-toluenesulfonate (trade name: "WPAG-367", manufactured by Wako Pure Chemical Co., Ltd.). A numerical value attached to polyethylene glycol is a number-average molecular weight. The "ACETYLENOL E60" is the trade name of a nonionic surfactant (ethylene oxide adduct of acetylene glycol) supplied by Kawaken Fine Chemicals Co., Ltd.).

In Table 3, lower-side columns show contents (%) of the components in the prepared inks, which are specifically contents of resin particles (R), photo acid generator (P), first unit (U1), organic groups in the second unit (U2), epoxy group-having unit (E) and oxetanyl group-having unit (O). The lower-side columns in Table 3 also show values of P/(U1+U2) and E(E+O). The content of the resin particles R includes the resin particles 1 to 19, resin 20 and 1,4-butanediol diglycidylether, however, does not include the resin dispersant for pigment.

TABLE 3

Compositions and properties of inks 1 to 28, 30

| | Inks | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Types of dispersion liquid of resin particles (Types of liquid containing resin) | 1 | 1 | 1 | 1 | 2 | 3 | 4 | 5 | 6 | 1 | 1 | 7 | 8 | 9 | 10 |
| Pigment dispersion liquid 1 | 12.50 | | | | 12.50 | 12.50 | 12.50 | 12.50 | 12.50 | 12.50 | 12.50 | 12.50 | 12.50 | 12.50 | 12.50 |
| Pigment dispersion liquid 2 | | 12.50 | | | | | | | | | | | | | |
| Pigment dispersion liquid 3 | | | 12.50 | | | | | | | | | | | | |
| Pigment dispersion liquid 4 | | | | 12.50 | | | | | | | | | | | |
| Dispersion liquid of resin particles (Liquid containing resin) | 50.00 | 50.00 | 50.00 | 50.00 | 50.00 | 50.00 | 50.00 | 50.00 | 50.00 | 50.00 | 50.00 | 50.00 | 50.00 | 50.00 | 50.00 |
| Dispersion liquid of photo acid generator 1 | 10.00 | 10.00 | 10.00 | 10.00 | | | | 5.00 | 5.00 | | | | 10.00 | 10.00 | 10.00 |
| Dispersion liquid of photo acid generator 2 | | | | | 10.00 | | | | | | | | | | |
| Dispersion liquid of photo acid generator 3 | | | | | | | | | | | | 10.00 | | | |
| Photo acid generator 4 | | | | | | | | | | 1.00 | | | | | |
| Ethylene glycol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Butanediol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,4-Butanediol diglycidyl ether | | | | | | | | | | | | | | | |
| Polyethylene glycol 1000 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| ACETYLENOL E60 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | 4.00 | 4.00 | 4.00 | 4.00 | 4.00 | 14.00 | 14.00 | 9.00 | 9.00 | 13.00 | 4.00 | 14.00 | 4.00 | 4.00 | 4.00 |
| Content of resin particles $C_R$(%) | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| Content of photo acid generator $C_P$(%) | 1.00 | 1.00 | 1.00 | 1.00 | 1.00 | 1.00 | 1.00 | 1.50 | 1.50 | 1.00 | 1.00 | 1.00 | 1.00 | 1.00 | 1.00 |
| Content of first unit $C_{U1}$(%) | 4.00 | 4.00 | 4.00 | 4.00 | 5.00 | 5.00 | 5.00 | 4.00 | 5.00 | 4.00 | 4.00 | 4.00 | 0.00 | 0.00 | 10.00 |
| Content of organic groups in second unit $C_{U2}$(%) | 3.60 | 3.60 | 3.60 | 3.60 | 3.76 | 2.74 | 3.25 | 3.60 | 3.76 | 3.60 | 3.60 | 3.60 | 5.89 | 5.48 | 0.00 |
| Content of epoxy group-having unit $C_E$(%) | 4.00 | 4.00 | 4.00 | 4.00 | 5.00 | 5.00 | 3.25 | 4.00 | 5.00 | 4.00 | 4.00 | 4.00 | 2.60 | 0.00 | 5.00 |
| Content of oxetanyl group-having unit $C_O$(%) | 3.60 | 3.60 | 3.60 | 3.60 | 3.76 | 2.74 | 5.00 | 3.60 | 3.76 | 3.60 | 3.60 | 3.60 | 3.29 | 5.48 | 5.00 |
| Value of $C_P/(C_{U1} + C_{U2})$ (times) | 0.13 | 0.13 | 0.13 | 0.13 | 0.11 | 0.13 | 0.12 | 0.20 | 0.17 | 0.13 | 0.13 | 0.13 | 0.17 | 0.18 | 0.10 |
| Value of $C_E/(C_E + C_O)$ (times) | 0.53 | 0.53 | 0.53 | 0.53 | 0.57 | 0.65 | 0.39 | 0.53 | 0.57 | 0.53 | 0.53 | 0.53 | 0.44 | 0.00 | 0.50 |

TABLE 3

Compositions and properties of inks 1 to 28, 30 (continued)

| | Inks | | | | | | | | | | | | | |
|---|---|---|---|---|---|---|---|---|---|---|---|---|---|---|
| | 16 | 17 | 18 | 19 | 20 | 21 | 22 | 23 | 24 | 25 | 26 | 27 | 28 | 30 |
| Types of dispersion liquid of resin particles (Types of liquid containing resin) | 11 | 1 | 1 | 12 | 12 | 13 | 14 | 15 | 16 | 17 | 18 | — | 19 | 20 |
| Pigment dispersion liquid 1 | 12.50 | 12.50 | 12.50 | 12.50 | 12.50 | 12.50 | 12.50 | 12.50 | 12.50 | 12.50 | 12.50 | 12.50 | 12.50 | 12.50 |
| Pigment dispersion liquid 2 | | | | | | | | | | | | | | |
| Pigment dispersion liquid 3 | | | | | | | | | | | | | | |
| Pigment dispersion liquid 4 | | | | | | | | | | | | | | |
| Dispersion liquid of resin particles (Liquid containing resin) | 50.00 | 50.00 | 50.00 | 50.00 | 50.00 | 50.00 | 50.00 | 50.00 | 50.00 | 50.00 | 50.00 | | 50.00 | 60.60 |
| Dispersion liquid of photo acid generator 1 | 10.00 | 2.00 | 3.80 | 8.00 | 14.00 | 10.00 | 10.00 | 10.00 | 10.00 | 10.00 | | | 10.00 | |
| Dispersion liquid of photo acid generator 2 | | | | | | | | | | | | | | |
| Dispersion liquid of photo acid generator 3 | | | | | | | | | | | | | | |
| Photo acid generator 4 | | | | | | | | | | | 1.00 | 1.00 | | |
| Ethylene glycol | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Butanediol | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,4-Butanediol diglycidyl ether | | | | | | | | | | | | 10.00 | | |
| Polyethylene glycol 1000 | 3.00 | 3.00 | 3.00 | 3.00 | 3.00 | 3.00 | 3.00 | 3.00 | 3.00 | 3.00 | 3.00 | 3.00 | 3.00 | 3.00 |
| ACETYLENOL E60 | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | 4.00 | 12.00 | 10.20 | 6.00 | 0.00 | 4.00 | 4.00 | 4.00 | 4.00 | 4.00 | 13.00 | 53.00 | 4.00 | 3.40 |
| Content of resin particles $C_R$(%) | 10.00 | 10.00 | 10.00 | 10.00 | 10.00 | 10.00 | 10.00 | 10.00 | 10.00 | 10.00 | 10.00 | 10.00 | 10.00 | 10.00 |
| Content of photo acid generator $C_P$(%) | 1.00 | 0.20 | 0.38 | 3.80 | 4.40 | 1.00 | 1.00 | 1.00 | 1.00 | 1.00 | 1.00 | 1.00 | 1.00 | 0.00 |
| Content of first unit $C_{U1}$(%) | 10.00 | 4.00 | 4.00 | 4.00 | 4.00 | 0.40 | 0.60 | 5.32 | 6.00 | 5.00 | — | — | 0.00 | — |
| Content of organic groups in second unit $C_{U2}$(%) | 0.00 | 3.60 | 3.60 | 3.60 | 3.60 | 5.76 | 5.64 | 2.81 | 2.40 | 3.76 | — | — | 0.00 | 0.00 |
| Content of epoxy group-having unit $C_E$(%) | 0.00 | 4.00 | 4.00 | 4.00 | 4.00 | 0.40 | 0.60 | 5.32 | 6.00 | 0.00 | — | — | 0.00 | — |
| Content of oxetanyl group-having unit $C_O$(%) | 0.00 | 3.60 | 3.60 | 3.60 | 3.60 | 5.76 | 5.64 | 2.81 | 2.40 | 8.76 | — | — | 0.00 | 0.00 |
| Value of $C_P/(C_{U1} + C_{U2})$ (times) | 0.10 | 0.03 | 0.05 | 0.50 | 0.58 | 0.16 | 0.16 | 0.12 | 0.12 | 0.11 | — | — | — | — |
| Value of $C_E/(C_E + C_O)$ (times) | — | 0.53 | 0.53 | 0.53 | 0.53 | 0.06 | 0.10 | 0.65 | 0.71 | 0.00 | — | — | — | — |

(Ink 29)

An ink 29 was prepared according to the example 1 described in Japanese Patent Application Laid-Open No. 2009-132812. The ink 29 contained a radically-polymerizable compound having a maleimide structure and a photopolymerization initiator (radical polymerization initiator).

<Evaluation>

An on-demand ink jet recording apparatus was used, which was equipped with a recording head configured to eject ink by applying, to the ink, a thermal energy corresponding to a recording signal. The apparatus was mounted with a heating device equipped with an infrared heater and a blower at positions adjacent to the recording head so as to heat an image immediately after being recorded. The conditions for heating set then were; heating temperature of 60° C., air blow speed of 9 m/sec., and drying time of five seconds. The apparatus was further mounted with an LED-UV lamp (wavelength range of 270 to 310 nm, center wavelength of 290 nm) at a position adjacent to the heating device. The luminous intensity of ultraviolet light was 70 mW/cm², and duration of irradiation was 20 seconds. The apparatus was further mounted with the same heating device as described above at a position adjacent to the LED-UV lamp for heating subsequent to ultraviolet irradiation. The heating conditions set for this heating device were; heating temperature of 60° C., air blow speed of 9 m/sec., and drying time of five seconds. Among the examples, ultraviolet irradiation was skipped for the reference example 1.

In the examples, an image recorded by applying approximately 16 ng of ink to a 1/600 inch-square unit region (1 pixel) was defined as having the recording duty of 100%. In the present invention, "A" and "B" were determined as acceptable and "C" as unacceptable based on criteria of evaluation set below. Table 4 shows the evaluation result.

(Abrasion Resistance)

Solid images (200 mm×200 mm) having the recording duty of 100% were recorded with the ink jet recording apparatus on recording mediums (trade name "OK Topcoat", basis weight of 127.9 g, manufactured by Oji Paper Co., Ltd.). In one hour after the solid-printing images were recorded, a friction test was performed, in which the solid images were rubbed back and forth 10 times under the load of 500 g with a Gakushin-type tester pursuant to JIS L 0849: 2013 (abrasion resistance tester, manufactured by Imoto Machinery Co., Ltd.). The tested sold images were visually checked to evaluate their degrees of abrasion resistance based on the criteria of evaluation defined below.

A: No visible scratch mark on the solid image

B: Scratch mark found on the solid image, with no exposure of the recording medium's raw surface C: Scratch mark found on the solid image, with the recording medium's raw surface being exposed (Water Resistance)

Solid images (200 mm×200 mm) having the recording duty of 100% were recorded with the ink jet recording apparatus on recording mediums (trade name "OK Topcoat", basis weight of 127.9 g, manufactured by Oji Paper Co., Ltd.). In one hour after the recording, a drop of pure water was dropped with a pipette onto the center of each solid image. After one minute passed, a piece of Silbon paper and a counterweight having the contact pressure of 40 g/cm² were placed on the solid image, and the Silbon paper and the solid image were rubbed against each other. After one day passed, the state of the sold image was visually checked to evaluate the water resistance of the image based on the criteria of evaluation defined below.

A: No visible scratch mark on the solid image

B: Scratch mark found on the solid image, with no exposure of the recording medium's raw surface C: Scratch mark found on the solid image, with the recording medium's raw surface being exposed

TABLE 4

Conditions and result of evaluation

| | | Conditions of evaluation | | Result of evaluation | |
|---|---|---|---|---|---|
| | Ink No. | | Whether ink was irradiated with active energy ray Yes/No | Abrasion resistance | Water resistance |
| Examples | 1 | 1 | Yes | A | A |
| | 2 | 2 | Yes | A | A |
| | 3 | 3 | Yes | A | A |
| | 4 | 4 | Yes | A | A |
| | 5 | 5 | Yes | A | A |
| | 6 | 6 | Yes | A | A |
| | 7 | 7 | Yes | A | A |
| | 8 | 8 | Yes | A | A |
| | 9 | 9 | Yes | A | A |
| | 10 | 10 | Yes | B | B |
| | 11 | 11 | Yes | B | A |
| | 12 | 12 | Yes | B | A |
| | 13 | 13 | Yes | B | B |
| | 14 | 14 | Yes | B | B |
| | 15 | 15 | Yes | B | B |
| | 16 | 16 | Yes | B | B |
| | 17 | 17 | Yes | B | B |
| | 18 | 18 | Yes | A | A |
| | 19 | 19 | Yes | A | A |
| | 20 | 20 | Yes | B | B |
| | 21 | 21 | Yes | B | A |
| | 22 | 22 | Yes | A | A |
| | 23 | 23 | Yes | A | A |
| | 24 | 24 | Yes | B | A |
| | 25 | 25 | Yes | B | A |
| | 26 | 26 | Yes | B | B |
| Comparative Examples | 1 | 27 | Yes | C | C |
| | 2 | 28 | Yes | C | C |
| | 3 | 29 | Yes | C | C |
| | 4 | 30 | Yes | C | C |
| Reference Example | 1 | 1 | No | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-161653, filed Aug. 30, 2018, and Japanese Patent Application No. 2019-142042, filed Aug. 1, 2019, which are hereby incorporated by reference herein in their entirety.

What is claimed is:

1. An aqueous ink of active energy ray curable type for ink jet, the aqueous ink comprising:
resin particles; and
a photo acid generator,
wherein the resin particles include a reactive group-containing resin having at least one reactive group selected from the group consisting of an epoxy group, an oxetanyl group, and a vinyl ether group.

2. The aqueous ink according to claim 1, wherein the photo acid generator is water-dispersible.

3. The aqueous ink according to claim 1, wherein the photo acid generator is an aryl sulfonium salt.

4. The aqueous ink according to claim 1, wherein the reactive group-containing resin comprises at least one of a first unit and a second unit,
wherein the first unit is a unit derived from (meth)acrylate having the reactive group; and
wherein the second unit includes a silsesquioxane structure and having an organic group that includes the reactive group and an inorganic group that includes a silsesquioxane unit.

5. The aqueous ink according to claim 4, wherein the reactive group-containing resin comprises both of the first unit and the second unit.

6. The aqueous ink according to claim 4, wherein a mass ratio of a content (% by mass) of the photo acid generator is 0.05 times or more to 0.50 times or less to a total of a content (% by mass) of the first unit and a content (% by mass) of the organic groups in the second unit.

7. The aqueous ink according to claim 4, wherein the reactive group comprises the epoxy group and the oxetanyl group, and
wherein, among the first unit and the second unit, a content $C_E$ (% by mass) of a unit having the epoxy group and a content $C_O$ (% by mass) of a unit having the oxetanyl group satisfy a relationship expressed by following formula (1);

$$0.10 \leq C_E/(C_E+C_O) \leq 0.65 \tag{1}$$

8. An ink cartridge comprising:
an ink; and
an ink storage portion for storing the ink,
wherein the ink comprises the aqueous ink according to claim 1.

9. An ink jet recording method comprising:
ejecting the aqueous ink according to claim 1 from a recording head of ink jet system to apply the aqueous ink onto a recording medium; and
irradiating the aqueous ink applied on the recording medium with active energy ray.

* * * * *